UNITED STATES PATENT OFFICE.

ARTHUR CHANUTE, OF DENVER, COLORADO.

PROCESS OF EXTRACTING METALS FROM COMPOUND ORES.

SPECIFICATION forming part of Letters Patent No. 501,559, dated July 18, 1893.

Application filed January 9, 1892. Serial No. 417,538. (No specimens.)

*To all whom it may concern:*

Be it known that I, ARTHUR CHANUTE, of the city of Denver, county of Arapahoe, and State of Colorado, have invented a certain new and useful Improvement in the Process of Extracting Metals from Compound Ores, of which the following is a specification.

My invention relates particularly to the treatment of that class of ores which contain in admixture with the precious metals and with lead a considerable quantity of zinc or zinc compounds, and which ores are, as is generally known, difficult to treat on account of their high percentage of zinc compounds; and the object of my invention is to simplify and cheapen the treatment of such ores. I have discovered that by mixing such ores with chloride of sodium or other haloid salts and subjecting the mixture to a considerable degree of heat, the chlorides of silver, gold, lead and zinc are readily formed and vaporized, and these metallic fumes can be caught and saved by the familiar expedient of passing them through screens or bags of textile material which retains the metallic fumes while permitting the gaseous products of combustion to escape freely, and this operation constitutes the main feature of my invention. The ore remaining in the furnace after the metallic haloids have been driven off may be smelted in the usual way, or, if they still contain too high a percentage of zinc, or if it is desired to extract a still larger proportion of its metallic value in the form of fumes, it may be again mixed with salt and subjected to the same treatment as before. It will be understood, of course, that the ore is to be finely divided before admixture with the salt and treatment in the furnace.

As a further step in the treatment of the ores I leach the metallic fumes collected as aforesaid in an aqueous solution of hydrochloric acid containing, say, from two to three per cent. of the acid. This treatment causes the zinc, together with the silver and gold to go into solution in the form of chlorides, the lead remaining undissolved. The silver and gold are next separated from the zinc by the addition of metallic zinc to the aqueous solution, as by the immersion of bars of zinc or by hanging zinc plates in the solution. The result of this is to precipitate the silver and gold leaving an aqueous solution of zinc chloride which can be readily drawn off leaving the precious metals together with the lead ready for smelting. If it is desired to separate the precious metals from the lead, this can be readily accomplished by drawing off the solution from the lead before the addition of the metallic zinc to it, the zinc being afterward added to precipitate the gold and silver.

In carrying my invention into practice the ore should be finely crushed and mixed with salt, the per cent. of which will vary somewhat with the composition of the ore. I find in the ores that I have treated that about twenty-five per cent. of salt is sufficient. The mixture is then placed in a proper furnace, (and I may here mention that the well known Wetherill furnace is well adapted for the purpose) and heated in the usual way, to wit: with admixture of carbon and the employment of a blast in the furnace specifically referred to. This roasting of the ore causes the gold, silver, lead and zinc to unite with the chlorine of the salt forming chlorides of the metals, which chlorides are volatilized by comparatively low temperatures and pass with the products of combustion through flues or pipes to any convenient point where they are filtered through screens or bags in the manner well known in the manufacture of oxide of zinc, and in the saving and utilization of the fumes from lead smelting and roasting operations, as described, for instance, in the patents to Lewis and Bartlett, the metallic chlorides are caught and retained by this operation, and I next place them in vats into which I run water acidulated with hydrochloric acid, the percentage of which may be considerably varied say, from two to ten per cent. On the thorough mixture of the metallic fumes with the acid solution the chlorides of zinc, gold and silver pass into solution leaving the lead undissolved. Metallic zinc, either in the form of bars or plates, is then suspended in the solution and having a greater affinity for chlorine than the precious metals these metals are dechloridized and precipitated in a metallic form leaving a solution containing chloride of zinc. This solution is then drawn off and the gold, silver and lead smelted in the usual way.

As I have before stated, and as is of course obvious, the solution may be separated from the lead if desired before the precious metals are precipitated.

It is obvious, of course, that my improved process is applicable to furnace products and other materials containing zinc as well as to raw ores, and while I have referred to common salt, it will be understood that the use of any of the haloids is within the scope of my invention, and also the use of any of the halogen acids in the place of hydrochloric acid, the haloids and halogen acids being full equivalents for each other in my process.

It will be seen that zinc chloride of a marketable character can be obtained by the simple concentration of the zinc chloride solution after the precipitation of the other metallic chlorides, and this method of obtaining chloride of zinc forms the subject matter of another application for Letters Patent filed by me February 13, 1892, Serial No. 421,447.

Having now described my invention, what I claim as new, and desire to secure by Letters Patent, is—

1. In the treatment of compound ores containing zinc the process which consists of mixing the finely divided ore with salt, roasting the mixture to form and drive off haloids of the zinc and other metals and catching the haloid fumes in screens or bags.

2. In the treatment of compound ores containing zinc the process which consists of mixing the finely divided ore with salt, roasting the mixture to form and drive off haloids of the zinc and other metals, catching the haloid fumes in screens or bags, then leaching the fumes in an aqueous solution of hydrochloric or other halogen acid to bring the haloids of zinc, silver and gold into solution and then precipitating and separating the gold and silver from the zinc by the addition of zinc to the solution.

ARTHUR CHANUTE.

Witnesses:
W. D. WOODMAN,
MARGARET MCARTHUR.